United States Patent [19]

Clark, Jr. et al.

[11] Patent Number: 4,997,582

[45] Date of Patent: Mar. 5, 1991

[54] COMPOSITIONS FOR ACID TREATING SUBTERRANEAN FORMATIONS

[75] Inventors: Earl Clark, Jr., Bartlesville; Billy L. Swanson, Delaware, both of Okla.

[73] Assignee: Phillips Petroleum Company, Bartlesville, Okla.

[21] Appl. No.: 335,150

[22] Filed: Apr. 7, 1989

Related U.S. Application Data

[60] Continuation of Ser. No. 142,483, Jan. 6, 1988, abandoned, which is a division of Ser. No. 939,591, Dec. 9, 1986, abandoned.

[51] Int. Cl.$^5$ .............................................. E21B 43/27
[52] U.S. Cl. .................................. 252/8.553; 166/307; 166/282
[58] Field of Search ............... 166/282, 271, 307, 308; 252/8.551, 8.553

[56] References Cited

U.S. PATENT DOCUMENTS

| | | | |
|---|---|---|---|
| 2,681,889 | 6/1954 | Menaul et al. | 252/8.553 |
| 2,717,876 | 9/1955 | Menaul | 252/8.553 |
| 3,252,904 | 5/1966 | Carpenter | 32/8.553 |
| 3,415,319 | 12/1968 | Gibson . | |
| 3,434,971 | 3/1969 | Atkins | 252/8.553 |
| 3,542,044 | 11/1970 | Hansen et al. | 137/13 |
| 3,727,689 | 4/1973 | Clampitt | 166/283 |
| 3,734,873 | 5/1973 | Anderson et al. | 252/363.5 |
| 3,754,599 | 8/1973 | Hummel et al. | 166/297 |
| 3,768,565 | 10/1973 | Persinski et al. | 166/308 |
| 3,791,446 | 2/1974 | Tate | 166/307 |
| 3,799,266 | 3/1974 | Kiel | 166/308 |
| 3,920,599 | 11/1975 | Hurlock et al. | 260/29.64 |
| 4,029,622 | 6/1977 | Keller et al. | 524/375 |
| 4,044,833 | 8/1977 | Volz | 166/307 |
| 4,219,429 | 8/1980 | Allen et al. | 252/8.553 |
| 4,233,165 | 11/1980 | Salathiel et al. | 252/8.553 |
| 4,290,901 | 9/1981 | Royle | 252/8.553 |
| 4,322,306 | 3/1982 | Dill | 252/8.553 |
| 4,359,391 | 11/1982 | Salathiel et al. | 252/8.553 |
| 4,432,881 | 2/1984 | Evani | 252/8.551 |
| 4,451,628 | 5/1984 | Dammann | 526/225 |
| 4,452,940 | 6/1984 | Rosen | 524/801 |
| 4,690,219 | 9/1987 | Burns et al. | 166/307 |
| 4,775,010 | 10/1988 | Clark, Jr. et al. | 252/8.553 X |

*Primary Examiner*—George A. Suchfield
*Attorney, Agent, or Firm*—Laney, Dougherty, Hessin & Beavers

[57] ABSTRACT

Methods and compositions for acid treating subterranean formations penetrated by well bores are provided. The compositions are each comprised of an aqueous acid solution, one or more acrylamide polymers dissolved in the acid solution, a liquid hydrocarbon dispersed in the acid solution, and one or more nonionic surface active agents having at least one reactive hydroxyl group per molecule. The acrylamide polymer or polymers increase the viscosity of the acid solution and the surface active agent or agents interact with the polymer of polymers whereby stabilized high viscosity results. The subterranean formation acid treating methods of the invention are carried out by introducing the high viscosity acid compositions therein, allowing the compositions to react until spent and recovering the compositions.

20 Claims, No Drawings

COMPOSITIONS FOR ACID TREATING SUBTERRANEAN FORMATIONS

This is a continuation of co-pending application Ser. No. 142,483 filed on Jan. 6, 1988, now abandoned, which is a division of co-pending application Ser. No. 939,591 filed on Dec. 9, 1986, now abandoned.

BACKGROUND OF THE INVENTION

1. Field of the Invention

The present invention relates to methods and compositions for stimulating production from subterranean formations by acid treating the formations.

2. Description of the Prior Art

Acid treatments of subterranean formations penetrated by well bores utilizing aqueous acid solutions have been carried out heretofore. Such treatments are commonly utilized in hydrocarbon containing subterranean formations to accomplish a number of purposes, the principal of which is to increase the production of hydrocarbons from the formations.

In treatments commonly referred to as "matrix acidizing", an aqueous acid solution is introduced into a subterranean formation under pressure so that the acid solution flows into the pore spaces of the formation. The acid solution reacts with carbonate rock and other reactive materials contained in the formation which increases the sizes of the pore spaces and increase the permeability of the formation. This in turn allows an increase in the flow of hydrocarbons through the formation into the well bore.

In treatments known as "fracture acidizing," a fracturing fluid is pumped into a subterranean formation under pressure and at a rate such that one or more fractures are produced. An acid solution is introduced into the fractures to etch flow channels in the fracture faces as well as to enlarge the pore spaces in the fracture faces. This in turn facilitates the flow of hydrocarbons through the subterranean formation into the well bore.

In both of the above-described acid treatments and in other similar treatments, the acid composition used can be combined with an inert gas, either in liquid or vapor form to "energize" the composition and facilitate its return from the treated formation.

It is highly advantageous for the aqueous acidizing solution utilized in subterranean formation acidizing procedures to be of relatively high viscosity whereby loss of the acid solution into highly permeable formations is minimized. The high viscosity also helps retard the reaction of the acid with reactive materials whereby the acid solution can be forced into areas of a subterranean formation remote from the well bore before the acid becomes spent. In addition, it is important that the spent acid solution retains enough viscosity to suspend fines and other solids generated by the acid reaction so that they are removed from the formation upon recovery of the spent acid solution.

While a variety of viscosity increasing agents have heretofore been utilized with aqueous acid solutions, e.g., hydratable polymers which are cross linked with suitable cross-linking agents, a problem which is often encountered is that the high viscosity aqueous acid solutions produced are not stable under conditions of use. For example, the effectiveness of a number of the viscosity increasing agents utilized heretofore rapidly decreases in the presence of acid whereby sufficient viscosity is not retained for the period of time required to carry out the desired treatment procedure.

By the present invention improved methods and high viscosity subterranean formation acid treating compositions are provided. The compositions have long-term stability, i.e., they retain sufficient viscosity over the times required for carrying out matrix acidizing and fracture acidizing procedures in subterranean formations whereby the spent compositions can suspend fines and other solids when removed from the formations.

SUMMARY OF THE INVENTION

Methods and compositions for acid treating subterranean formations penetrated by well bores are provided. The compositions are each comprised of an aqueous acid solution, one or more water soluble acrylamide polymers dissolved in the acid solution in an amount sufficient to increase the viscosity thereof, a liquid hydrocarbon dispersed in the acid solution, and a nonionic surface active agent having at least one reactive hydroxyl group per molecule dissolved in the liquid hydrocarbon. The surface active agent is present in the composition in an amount sufficient to interact with the acrylamide polymer or polymers in the presence of the dispersed hydrocarbon whereby the viscosity of the acid solution is further increased and stabilized.

The methods are comprised of introducing the high viscosity acid compositions of the invention into subterranean formations by way of well bores penetrating the formations. The acid compositions are allowed to react with materials in the formations until spent and are then recovered from the formations. The compositions retain their high viscosity for extended periods of time whereby the methods can be carried out prior to appreciable loss of viscosity. Upon recovery, the compositions still have sufficient viscosity to carry fines generated by reaction of the acid with reactive materials in the formations out of the formations.

It is, therefore, a general object of the present invention to provide improved methods and compositions for acid treating subterranean formations penetrated by well bores.

A further object of the present invention is the provision of high viscosity acid compositions which have excellent stability under conditions of use, e.g., the retention of sufficient viscosity to complete the carrying out of methods of acid treating subterranean formations.

Other and further objects, features and advantages of the present invention will be readily apparent to those skilled in the art upon a reading of the description of preferred embodiments which follows.

DESCRIPTION OF THE PREFERRED EMBODIMENTS

The present invention encompasses and includes methods of acid treating subterranean formations penetrated by well bores whereby high viscosity acid compositions are introduced into the formations by way of the well bores, allowed to react with acid dissolvable materials in the formations until spent and then recovered from the formations along with fines and other residue produced as a result of the acid reactions.

The high viscosity acid compositions of this invention are basically each comprised of an aqueous acid solution having one or more acrylamide polymers dissolved therein in an amount sufficient to increase the viscosity of the solution. A liquid hydrocarbon is dispersed in the acid solution which includes one or more nonionic surface active agents dissolved therein having at least one reactive hydroxyl group per molecule. The surface active agent or agents are present in an amount sufficient to interact with the acrylamide polymer or polymers in the presence of the dispersed hydrocarbon whereby the viscosity of the acid solution is further increased and stabilized.

A particularly convenient technique for preparing the acid compositions of this invention is to prepare the one or more acrylamide polymers using conventional emulsion polymerization processes with the nonionic surface active agent or agents to be added to the acid solutions as the emulsifier or emulsifiers in the polymerization processes. The polymerization process reaction mixtures are then utilized directly to form the acid compositions. Additional liquid hydrocarbon can be added to further increase the viscosity of the acid compositions.

The aqueous acid solution utilized can contain any of a variety of acids which react with materials in subterranean formations and can be of any desired acid concentration. Generally, mineral acids such as hydrochloric acid, hydrofluoric acid, phosphoric acid, sulfuric acid and nitric acid are preferred since they readily react with minerals commonly found in subterranean formations. The particular concentration of the acid in the aqueous solution depends on the particular acid or acids used, the particular type of rock formation to be acidized or etched in the formation, etc. Generally, aqueous acid concentrations in the range of from about 5% to about 50% by weight of the acid solution are utilized, preferably from about 3% to about 28% by weight. A particularly preferred acid solution is an aqueous hydrochloric acid solution containing about 28% by weight hydrochloric acid.

A variety of water soluble acrylamide polymers can be employed in accordance with the present invention. Of these, polyacrylamide homopolymer and copolymers of acrylamide and ethylenically unsaturated monomers are preferred. The acrylamide copolymers preferably include acrylamide monomeric units in a quantity above about 15% of the total monomeric units making up the copolymer. The most preferred acrylamide polymers are polyacrylamide, vinyl pyrrolidone-acrylamide copolymers, 2-acrylamido-2methylpropanesulfonic acid-acrylamide copolymers, and acrylamidevinyl pyrrolidone-2 acrylamido-2-methylpropanesulfonic acid terpolymer. The most preferred acrylamide polymer is a vinyl pyrrolidone-acrylamide copolymer having in the range of from about 40% to about 60% of the monomeric units comprised of acrylamide.

The acrylamide polymers can be utilized in a dry solid state or aqueous solutions or emulsions containing the polymers can be added directly to the aqueous acid solution. The particular amount of polymer employed in the aqueous acid solution is dependent upon a number of factors relating to the particular type of treatment to be performed, the particular formation to be treated, the bottom hole temperature of the well to be treated, etc. Generally, however, the polymer or polymers are dissolved in the aqueous acid solution in an amount in the range of from about 1 to about 200 pounds per 1000 gallons of aqueous acid solution. The preferred amount of acrylamide polymer is from about 30 to about 120 pounds per 1000 gallons of acid solution with the most preferred being about 80 pounds per 1000 gallons of aqueous acid solution.

The water soluble acrylamide polymers employed should have a molecular weight above about 100,000, and most preferably, polymers having a molecular weight in the range of from about 100,000 to about 10,000,000 are utilized. When such polymers are dissolved in an aqueous acid solution, an immediate increase in the viscosity of the solution results.

One or more of various light liquid hydrocarbons can be utilized in accordance with this invention such as diesel oil, kerosene, gasoline, xylenes, toluenes, mineral oils, light paraffinic oils and the like. Preferred such hydrocarbon liquids are diesel oil, kerosene, xylenes and light paraffinic oils, with diesel oil being the most preferred. As stated above, the liquid hydrocarbon utilized can be combined with the surface active agent or agents used and then dispersed into the aqueous acid solution; or the surface active agent or agents can be utilized in the emulsion polymerization of the acrylamide polymer or polymers employed with the polymerization reaction mixture being directly added to the acid solution followed by additional liquid hydrocarbons.

The surface active agents which are suitable for use are nonionic compounds having at least one reactive hydroxyl group and having surface active properties whereby in addition to interacting with the acrylamide polymer, they function as dispersing agents for the liquid hydrocarbon in the aqueous acid solution. The nonionic surface active agent or agents interact in the presence of the liquid hydrocarbon with the acrylamide polymer or polymers whereby the viscosity of the acid solution is further increased and stabilized. A variety of nonionic surface active compounds having at least one reactive hydroxyl group can be utilized including, but not limited to, sorbitan fatty acid esters, ethoxylated mixtures of sorbitol and its anhydrides with fatty acids, and ethoxylated alcohols. Of these, sorbitan monooleate, sorbitan trioleate, polyoxyethylene (20) sorbitan monooleate, polyoxyethylene (20) sorbitan trioleate and a mixture of polyoxyethylene (4) cetyl alcohol and polyoxyethylene (4) stearyl alcohol are preferred.

The liquid hydrocarbon utilized is mixed with the aqueous acid solution in an amount in the range of from about 2% to about 80% by volume of the resulting mixture, preferably about 9% by volume of the mixture. The surface active agent or agents utilized are combined with the acid composition in an amount sufficient to interact with the acrylamide polymer or polymers in the composition in the presence of the liquid hydrocarbon to further increase the viscosity of the composition and stabilize such viscosity. Generally, the surface active agent or agents are dissolved in the liquid hydrocarbon or otherwise combined with the acid composition in an amount in the range of from about 5 to about 50 pounds per 1000 gallons of aqueous acid solution used, and preferably in an amount of about 30 pounds per 1000 gallons of aqueous acid solution.

The most preferred high viscosity acid composition of the present invention is comprised of an aqueous hydrochloric acid solution with a vinyl pyrrolidone-acrylamide copolymer having a 60:40 vinyl pyrrolidone to acrylamide monomer ratio dissolved in the aqueous acid solution in an amount of about 80 pounds per 1000 gallons of aqueous acid solution. Sorbitan monooleate is combined with the solution in an amount of about 30 pounds per 1000 gallons of aqueous acid solution, and diesel oil is mixed with the solution in an amount of about 9% by volume of the resulting composition.

In carrying out the method of the present invention for acid treating subterranean formations penetrated by well bores, a high viscosity acid composition of the present invention is introduced into a subterranean formation and allowed to react with reactive materials in the formation until spent. The spent composition along with fines and other solid reaction products are recovered from the formation.

In order to further illustrate the methods and compositions of the present invention and facilitate a clear understanding thereof, the following examples are given.

EXAMPLE 1

Viscosity versus time tests are carried out using various compositions of the present invention. The compositions are comprised of an aqueous hydrochloric acid solution containing 28% by weight hydrochloric acid with a vinyl pyrrolidone-acrylamide copolymer having a 60:40 vinyl pyrrolidone to acrylamide monomer ratio dissolved in the aqueous acid solution in the amount of 60 pounds per 1000 gallons of acid solution. Diesel oil is dispersed in the acid solution in an amount of 88.9 pounds per 1000 gallons of acid solution. Various surface active agents are dissolved in the diesel oil in amounts of 33 pounds per 1000 gallons of acid solution.

The various compositions are prepared while stirring with a Hamilton Beach multimixer. The mixer speed is controlled with a powerstat to give about 5,500 rpm initially, and the speed declines as the solution viscosity increases. After five minutes of stirring, each sample is removed from the mixer and foam that has developed is allowed to subside or is removed.

Viscosity measurements are made at room temperature using 250 milliliter samples of each composition on a FANN Model 35 VG viscometer. The initial viscosity measurements are made at the end of the five-minute stirring period with additional viscosity measurements being made at various time intervals. The viscosity measurements are made at shear rates of 511 and 171 reciprocal seconds. The samples are left on the viscometer and stirred at 100 rpm between viscosity measurements during the first ten minutes. Thereafter, the samples are removed after each viscosity measurement. The results of these tests are given in Table I below.

TABLE I

| | Viscosity vs. Time Tests | | |
|---|---|---|---|
| Surface Active Agent Used | Viscosity Measurement Time After Initial Stirring Period, Min. | Viscosity in Centipoises at Shear Rate, Sec$^{-1}$ | |
| | | 511 | 171 |
| None | 30 | 36 | 54 |
| Sorbitan Monooleate[1] | 30 | 300+ | 615 |
| Polyoxyethylene (20) Sorbitan Trioleate[2] | 30 | 59 | 93 |
| Polyoxyethylene (20) Sorbitan Trioleate[2] | 180 | 48 | 72 |
| Mixture of Polyoxyethylene (4) Cetyl and Stearyl Alcohols[3] | 30 | 63 | 102 |
| Mixture of Polyoxyethylene (4) Cetyl and Stearyl Alcohols[3] | 180 | 74 | 120 |
| Sorbitan Trioleate[4] | 5 | 43 | 69 |
| Sorbitan Trioleate[4] | 60 | 48 | 75 |
| Sorbitan Trioleate[4] | 180 | 49 | 78 |

[1]Sold under the tradename Span 80 by Atlas Chemical Industries
[2]Sold under the tradename Tween 85 by Atlas Chemical Industries
[3]Sold under the tradename Siponic E-2 by Alcolac, Inc.
[4]Sold under the tradename Span 85 by Atlas Chemical Industries From Table I it can be seen that in the presence of dispersed diesel oil the various surface active agents increase and stabilize the viscosity of the compositions.

EXAMPLE 2

The procedure described in Example 1 is repeated except that the acrylamide polymer used is a 2-acrylamido-2-methylpropanesulfonic acid (AMPS)-acrylamide copolymer having a 70:30 AMPS to acrylamide monomer ratio. In addition, varying amounts of surface active agents are utilized. The results of these tests are given in Table II below.

TABLE II

| | Viscosity vs. Time Tests | | | |
|---|---|---|---|---|
| Surface Active Agent Used | Surface Active Agent Concentration Lb./1000 Gal. of Acid Solution | Viscosity Measurement Time After Initial Stirring Period, Min. | Viscosity in Centipoises at Shear Rate, Sec$^{-1}$ | |
| | | | 511 | 171 |
| None | — | 30 | 15 | 18 |
| Sorbitan Monooleate[1] | 33.0 | 5 | 39 | 45 |
| Sorbitan Monooleate[1] | 33.0 | 120 | 16 | 18 |
| Mixture of Polyoxyethylene (4) Cetyl and Stearyl Alcohols[2] | 6.6 | 30 | 17 | 21 |
| Mixture of Polyoxyethylene (4) Cetyl and Stearyl Alcohols[2] | 13.2 | 30 | 18 | 22.5 |
| Mixture of Polyoxyethylene (4) Cetyl and Stearyl Alcohols[2] | 20.0 | 30 | 19 | 22 |
| Mixture of Polyoxyethylene (4) Cetyl and | 33.0 | 5 | 18 | 21 |

TABLE II-continued

Viscosity vs. Time Tests

| Surface Active Agent Used | Surface Active Agent Concentration Lb./1000 Gal. of Acid Solution | Viscosity Measurement Time After Initial Stirring Period, Min. | Viscosity in Centipoises at Shear Rate, Sec$^{-1}$ | |
| --- | --- | --- | --- | --- |
| | | | 511 | 171 |
| Stearyl Alcohols[2] Mixture of Polyoxyethylene (4) Cetyl and Stearyl Alcohols[2] | 33.0 | 30 | 19 | 24 |
| Mixture of Polyoxyethylene (4) Cetyl and Stearyl Alcohols[2] | 33.0 | 240 | 20 | 27 |

[1]Sold under the tradename Span 80 by Atlas Chemical Industries
[2]Sold under the tradename Siponic E-2 by Alcolac, Inc.

EXAMPLE 3

The procedure described in Example 1 above is repeated except that various other acrylamide polymers are utilized. The results of these tests are given in Table III below.

TABLE III

Viscosity vs. Time Tests

| Acrylamide Polymer Used | Surface Active Agent Used | Surface Active Agent Concentration Lb./1000 Gal. of Acid Solution | Viscosity Measurement Time After Initial Stirring Period, Min. | Viscosity in Centipoises at Shear Rate, Sec$^{-1}$ | |
| --- | --- | --- | --- | --- | --- |
| | | | | 511 | 171 |
| Polyacrylamide | None | — | 30 | 19 | 24 |
| | None | — | 180 | 19 | 24 |
| | Mixture of Polyoxyethylene (4) Cetyl and Stearyl Alcohols[1] | 33 | 5 | 23 | 30 |
| | Mixture of Polyoxyethylene (4) Cetyl and Stearyl Alcohols[1] | 33 | 30 | 22 | 30 |
| | Mixture of Polyoxyethylene (4) Cetyl and Stearyl Alcohols[1] | 33 | 180 | 24 | 30 |
| Polyvinyl Pyrrolidone | None | — | 30 | 6 | 6 |
| | Mixture of Polyoxyethylene Cetyl and Stearyl Alcohols[1] | 33 | 30 | 7 | 7.5 |

[1]Sold under the tradename Siponic E-2 by Alcolac, Inc.

From the above it can be seen that the surface active agent interacts with polyacrylamide but does not appreciably interact with polyvinyl pyrrolidone.

EXAMPLE 4

The procedure given in Example 1 above is repeated using a vinyl pyrrolidone-acrylamide copolymer having a 60:40 vinyl pyrrolidone to acrylamide monomer ratio. The copolymer is prepared by an emulsion polymerization process utilizing sorbitan monooleate, polyoxyethylene (20) sorbitan trioleate, and a mixture of polyoxyethylene cetyl and stearyl alcohols as emulsifiers. Portions of the entire polymerization reaction mixture containing the copolymer, water, liquid hydrocarbon and emulsifiers are combined with the acid compositions. Additional liquid hydrocarbon is dispersed in the compositions in various amounts. The results of these tests are given in Table IV below.

TABLE IV

Viscosity vs. Time Tests

| Percent Oil[2] | Liquid Hydrocarbon Added | Liquid Hydrocarbon Concentration Lb./1000 Gal. of Acid Solution[3] | Viscosity Measurement Time After Initial Stirring Period, Min. | Viscosity in Centipoises at Shear Rate, Sec$^{-1}$ | |
|---|---|---|---|---|---|
| | | | | 511 | 171 |
| 2.0 | None | — | 30 | 33 | 48 |
| 2.7 | Diesel Oil | 60 | 5 | 29 | 43.5 |
| 2.7 | Diesel Oil | 60 | 10 | 31 | 48 |
| 2.7 | Diesel Oil | 60 | 30 | 35 | 51 |
| 5.6 | Diesel Oil | 300 | 5 | 34 | 51 |
| 5.6 | Diesel Oil | 300 | 10 | 37 | 54 |
| 5.6 | Diesel Oil | 300 | 30 | 42 | 63 |
| 9.2 | Diesel Oil | 600 | 5 | 40 | 60 |
| 9.2 | Diesel Oil | 600 | 10 | 43 | 66 |
| 9.2 | Diesel Oil | 600 | 30 | 50 | 75 |
| 9.2 | Diesel Oil | 600 | 120 | — | 141 |
| 5.6 | Light Hydrocarbon Mixture[1] | 300 | 5 | 35 | 51 |
| 5.6 | Light Hydrocarbon Mixture[1] | 300 | 10 | 37 | 57 |
| 5.6 | Light Hydrocarbon Mixture[1] | 300 | 30 | 40 | 60 |
| 5.6 | Light Hydrocarbon Mixture[1] | 300 | 180 | 51 | 81 |
| 5.6 | Light Hydrocarbon Mixture | 300 | 360 | 72 | 117 |
| 5.6 | Light Hydrocarbon Mixture[1] | 300 | 4320 | 78 | 130 |

[1] Sold under the tradename Soltrol 145 by Phillips Petroleum Co.
[2] Percent oil - Grams of oil per 100 ml solution. This includes oil from the polymerization process and additional oil added.
[3] These figures reflect the additional oil added to the acid-emulsion mixture only.

EXAMPLE 5

The procedure of Example 4 above is repeated except that a vinyl pyrrolidone-acrylamide copolymer is used having a 50:50 vinyl pyrrolidone to acrylamide monomer ratio in an amount of 50 lb./1000 gal. acid solution. The results of these tests are given in Table V below.

TABLE V

Viscosity vs. Time Tests

| Liquid Hydrocarbon Added | Liquid Hydrocarbon Concentration Lb./1000 Gal. of Acid Solution | Viscosity Measurement Time After Initial Stirring Period, Min. | Viscosity in Centipoises at Shear Rate, Sec$^{-1}$ | |
|---|---|---|---|---|
| | | | 511 | 171 |
| None | — | 10 | 22 | 30 |
| None | — | 30 | 22 | 30 |
| Diesel Oil | 300 | 5 | 23 | 33 |
| Diesel Oil | 300 | 10 | 24 | 33 |
| Diesel Oil | 300 | 30 | 26 | 36 |

From Tables IV and V it can be seen that increasing the amounts of liquid hydrocarbon added to the acid compositions increases the viscosities thereof.

The preceding examples can be repeated with similar success by substituting the generically or specifically described components or reactants of this invention for those used in the examples. From the foregoing description, one skilled in the art can easily ascertain the essential characteristics of this invention, and without departing from the spirit and scope thereof, can make various changes and modifications to adapt the invention to various usages and conditions.

What is claimed is:

1. A high viscosity acid composition comprised of:
an aqueous acid solution;
one or more acrylamide polymers dissolved in said acid solution in an amount sufficient to increase the viscosity of said acid solution;
a liquid hydrocarbon dispersed in said acid solution; and
one or more nonionic surface active agents having at least one reactive hydroxyl group per molecule present in said composition in an amount sufficient to interact with said acrylamide polymer or polymers in the presence of said liquid hydrocarbon whereby the viscosity of said acid solution is further increased and stabilized.

2. The composition of claim 2 wherein said aqueous acid solution has an acid concentration in the range of from about 3% to about 28% by weight.

3. The composition of claim 2 wherein said aqueous acid solution is an aqueous hydrochloric acid solution.

4. The composition of claim 1 wherein said one or more acrylamide polymers are selected from the group consisting of polyacrylamide, vinyl pyrrolidone-acrylamide copolymers, 2-acrylamido-2-methylpropanesulfonic acid-acrylamide copolymers, and acrylamide-vinyl pyrrolidone-2 acrylamido-2-methylpropanesulfonic acid terpolymers.

5. The composition of claim 4 wherein said one or more acrylamide polymers are present in said composition in an amount in the range of from about 1 to about 200 pounds per 1000 gallons of aqueous acid solution.

6. The composition of claim 1 wherein said acrylamide polymer is a vinyl pyrrolidone-acrylamide copolymer and is present in said composition in an amount of about 80 pounds per 1000 gallons of aqueous acid solution.

7. The composition of claim 6 wherein said liquid hydrocarbon is diesel oil and is present in said composition in an amount of about 9% by volume of said composition.

8. The composition of claim 7 wherein said surface active agent is sorbitan monooleate present in said composition in an amount of about 30 pounds per 1000 gallons of said aqueous acid solution.

9. The composition of claim 1 wherein said liquid hydrocarbon is selected from the group consisting of diesel oil, kerosene, xylenes, mineral oils and light paraffinic oils.

10. The composition of claim 9 wherein said liquid hydrocarbon is present in said composition in an amount in the range of from about 2% to about 80% by volume of said composition.

11. The composition of claim 1 wherein said one or more surface active agents are dissolved in said liquid hydrocarbon, are selected from the group consisting of sorbitan monooleate, sorbitan trioleate, polyoxyethylene (20) sorbitan monooleate, polyoxyethylene (20) sorbitan trioleate and a mixture of polyoxyethylene (4) cetyl alcohol and polyoxyethylene (4) stearyl alcohol and are present in said composition in an amount in the range of from about 5 to about 50 pounds per 1000 gallons of said aqueous acid solution.

12. The composition of claim 1 wherein said one or more acrylamide polymers are prepared by emulsion polymerization processes utilizing said one or more surface active agents as emulsifiers therein and the resulting reaction mixture comprising said acrylamide polymers and surface active agents are utilized to prepare said composition.

13. The composition of claim 1 wherein said acrylamide polymers are copolymers containing acrylamide monomeric units in a quantity above about 15% of the total monomeric units making up the copolymers.

14. A high viscosity acid composition comprised of:
an aqueous acid solution having an acid concentration in the range of from about 3% to about 28% by weight;
one or more acrylamide polymers dissolved in said acid solution in an amount sufficient to increase the viscosity of said acid solution, said acrylamide polymers being selected from the group consisting of polyacrylamide, vinyl pyrrolidone-acrylamide copolymers, 2-acrylamido-2-methylpropanesulfonic acid-acrylamide copolymers, and acrylamide-vinyl pyrrolidone-2 acrylamido-2-methylpropanesulfonic acid terpolymers;
a liquid hydrocarbon dispersed in said acid solution in an amount in the range of from about 2% to about 80% by volume of said composition; and
one or more nonionic surface active agents having at least one reactive hydroxyl group per molecule present in said composition in an amount sufficient to interact with said acrylamide polymer or polymers in the presence of said liquid hydrocarbon whereby the viscosity of said acid solution is further increased and stabilized, said one or more nonionic surface active agents being selected from the group consisting of sorbitan monooleate, sorbitan trioleate, polyoxyethylene (20) sorbitan monooleate, polyoxyethylene (20) sorbitan trioleate and a mixture of polyoxyethylene (4) cetyl alcohol and polyoxyethylene (4) stearyl alcohol.

15. The composition of claim 14 wherein said one or acrylamide polymers are present in said composition in an amount in the range of from about 1 to about 200 pounds per 1000 gallons of said aqueous acid solution.

16. The composition of claim 14 wherein said acrylamide polymer is a vinyl pyrrolidone-acrylamide copolymer and is present in said composition in an amount of about 80 pounds per 1000 gallons of aqueous solution.

17. The composition of claim 16 wherein said liquid hydrocarbon is diesel oil and is present in said composition in an amount of about 9% by volume of said composition.

18. The composition of claim 17 wherein said surface active agent is sorbitan monooleate present in said composition in an amount of about 30 pounds per 1000 gallons of said aqueous acid solution.

19. The composition of claim 14 wherein said liquid hydrocarbon is selected from the group consisting of diesel oil, kerosene, xylenes, minerals oils and light paraffinic oils.

20. The composition of claim 14 wherein said one or more surface active agents are present in said composition in an amount in the range of from about 5 to about 50 pounds per 1000 gallons of said aqueous acid solution.

* * * * *